Dec. 10, 1929.  R. W. BUMSTEAD  1,739,058
ELAPSED RUNNING TIME COUNTER
Filed July 27, 1923  2 Sheets-Sheet 1

Inventor.
Ralph W. Bumstead
by Heard Smith & Tennant.
Attys.

Dec. 10, 1929.            R. W. BUMSTEAD            1,739,058
ELAPSED RUNNING TIME COUNTER
Filed July 27, 1923            2 Sheets-Sheet 2
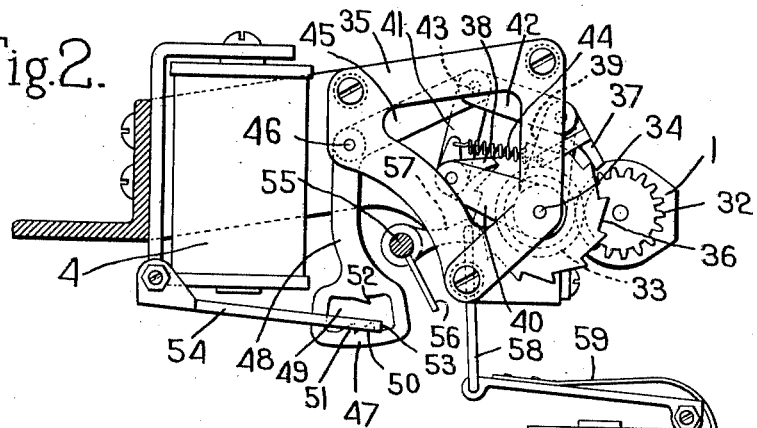
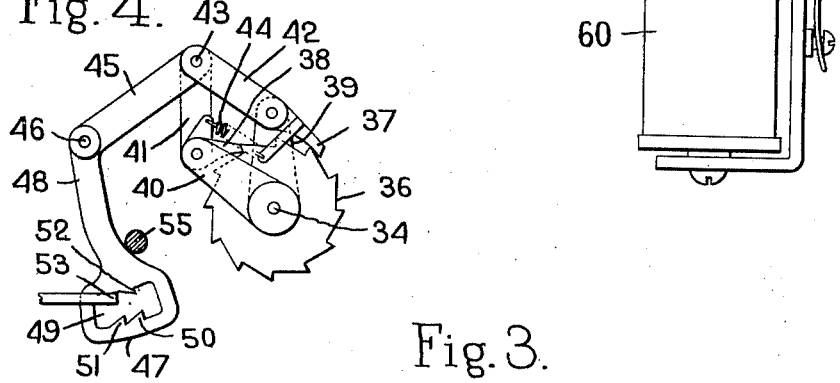
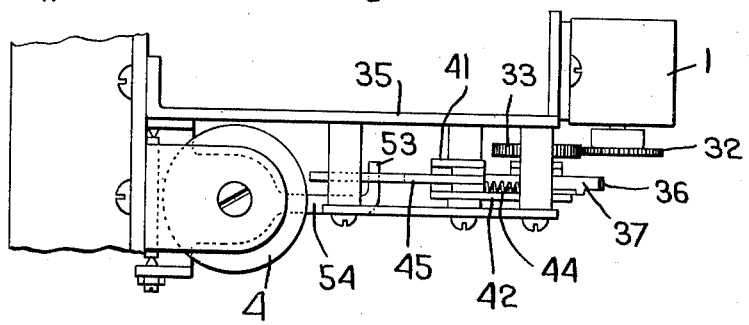
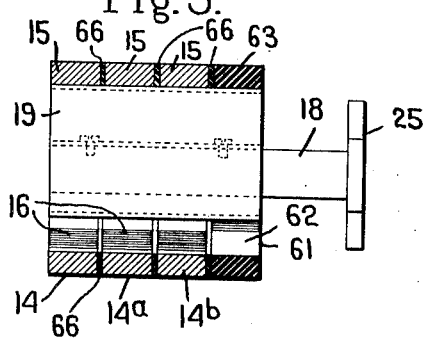
Inventor.
Ralph W. Bumstead
by Heard Smith & Tennant.
Attys.

Patented Dec. 10, 1929

1,739,058

UNITED STATES PATENT OFFICE

RALPH W. BUMSTEAD, OF WESTFIELD, NEW JERSEY

ELAPSED-RUNNING-TIME COUNTER

Application filed July 27, 1923. Serial No. 654,199.

This invention relates to a device for indicating the elapsed running time, and consequently the efficiency, of a machine or group of machines. This indication may be made or registered in terms of machine-running hours or in terms of output of the machine or group of machines or in terms of wages, when the latter are based on the output of the machine or group of machines.

The device is specially adapted for metering the total machine-running hours or the total output of a group of machines under the control of a single operator and is constructed so that the indicator or register will indicate the summation of the total running time or the total output of all the machines of the group.

The device comprises a register, counter or indicator, means for actuating the same including an electromagnet, means for operatively connecting the magnet with the various machines of the group successively and with each machine periodically, and means whereby the magnet is operative when connected to a running machine but is non-operative when connected to an idle machine, whereby the register or counter will make an indication when the magnet is connected to a running machine but no indication is made when the magnet is connected to an idle machine. In this way each machine is periodically tested, as it were, to determine if it is running or is idle and if it is running this fact is noted on the counter or indicator while if it is not running no registration is made. The period of time elapsing between successive tests of the same machine has such a relation to the character of the operation performed by the machine that the total indicated on the counter or indicator will be an acucrate statement of the machine running hours of the group of machines.

In order to give an understanding of my invention I have illustrated in the drawings a selected embodiment thereof which will now be described after which the novel features will be pointed out in the appended claims.

Fig. 2 is a view illustrating in some detail the mechanism by which the magnet or solenoid actuates the counter;

Fig. 3 is a top plan view of Fig. 2;

Fig. 4 is a view of a part of the counter-actuating mechanism showing it in a different position from that illustrated in Fig. 2;

Fig. 5 is a longitudinal sectional view through the distributor.

Figure 1:
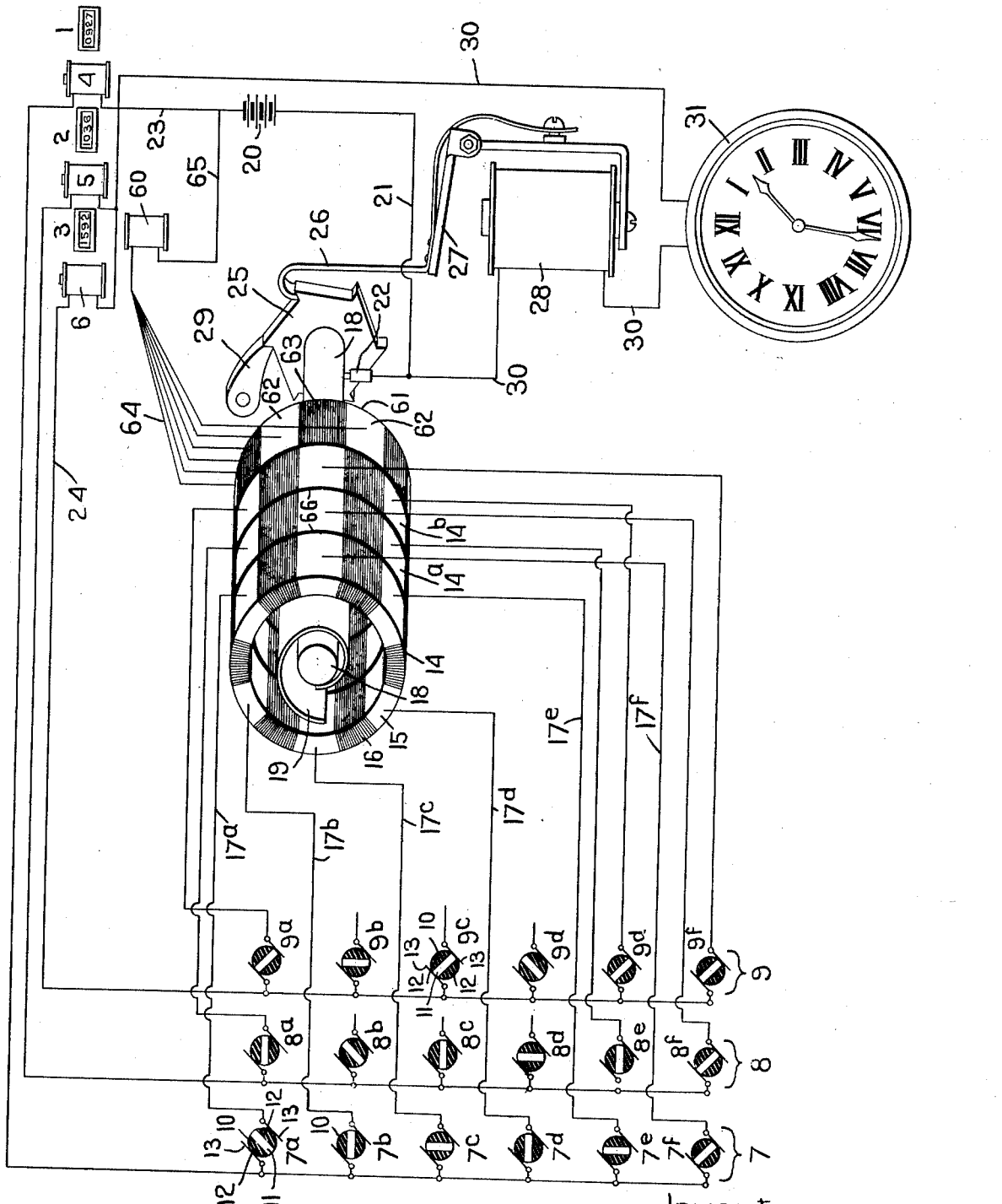
Fig. 1 is a diagrammatic view illustrating the wiring of the apparatus and some of the mechanical construction.

In many factories it is the custom for one operator to tend a plurality of machines, the number of machines assigned to each operator depending, of course, upon the character of the machine and the character of the work performed thereby. My invention is such that it may be used for giving an indication of the machine-running hours or output of any number of machines.

In the illustrated embodiment of the invention I have shown a construction which is adapted for use where each operator tends or has charge of six machines. The construction required for one operator may easily be duplicated for other operators, there being a counter or indicator with its associated mechanism for each operator.

In Fig. 1 I have, merely for illustration, shown a construction adapted for three operators each controlling a group of six machines. As stated above there is a counter or indicator for each operator which indicates the machine-running hours or output of the group of machines tended by said operator. These counters are indicated in Fig. 1 at 1, 2 and 3 respectively. Each counter is actuated or controlled by a pulsating current detector such as a magnet or solenoid, the latter being indicated at 4, 5 and 6 respectively.

The means by which each magnet when energized steps its counter forward one step will be hereinafter explained more in detail.

I have not indicated in the drawings the machines which the operators control but each machine has associated with it a make-and-break device and the make-and-break devices of each group of machines, that is, the machines tended by each operator, are connected to the corresponding magnet. The use of a make-and-break device in the electric circuits of this invention may be compared with a transmitter on a telegraph line. In this respect such make-and-break device may be regarded as a signaling station from which impulses are automatically signalled to the receiving magnet or counter-actuating device. The repeated interruption of the circuit caused by the functioning of the make-and-break device of a moving machine will transmit a signal, the reception of which results in advancing the counter, whereas in the case of a circuit being established between the counter-actuating magnet and the make-and-break device or signaling station associated with an idle machine, either no signal is transmitted at all, or the character of the signal is modified so that it becomes ineffective.

In the illustration in Fig. 1 which shows a device arranged for three groups of machines tended by three different operators the make-and-break devices for one group of machines are indicated at 7, those for another group of machines are indicated at 8, those for the third group of machines indicated at 9. The individual make-and-break devices of group 7 are indicated at $7^a$, $7^b$, $7^c$, $7^d$, $7^e$ and $7^f$ respectively and those of the groups 8 and 9 are similarly indicated. These make-and-break devices may have any suitable construction, and as illustrated each comprises a rotating member 10 connected to the machine in some way so as to rotate synchronously therewith and constructed with a diametrically-arranged conducting portion 11 having two portions 12 of insulating material on opposite sides thereof.

Two brushes 13 bear against the rotary member 10, said brushes being connected in a circuit leading to the magnet 4 so that as the member 10 rotates the circuit will be alternately opened and closed. There is a make-and-break device of this character for each of the machines as stated above.

Means are also provided whereby the magnet for any group of machines is connected to the machines successively and each machine periodically. This is done through a suitable distributor, one construction of which is shown in Fig. 1 for illustrative purposes. The distributor shown comprises a ring 14 made up of conducting sections 15, and insulating sections 16 arranged alternately, there being as many conducting sections 15 as there are make-and-break devices 10. These conducting sections 15 are connected to the various make-and-break devices of group 7 through circuit wires $17^a$, $17^b$, $17^c$, $17^d$, $17^e$ and $17^f$ respectively.

Situated inside of the ring 14 is a rotary shaft 18 which has thereon a brush 19 that engages the contacts 15 successively as the shaft rotates. This shaft is rotated intermittently, each step forward thereof carrying the brush from one conducting section 15 of the ring across the adjacent section 16 of insulation and onto the next conducting section 15.

The shaft 18 is connected into the circuit for the counter-actuating magnets. The current for this is derived from a battery 20 or other source of electrical energy which is connected by a circuit wire 21 and brush 22 to the shaft 18. The battery is also connected through the circuit wire 23 to the magnet 4 which corresponds to the group 7 of the make-and-break devices and which in turn is connected by a circuit wire 24 to said make-and-break devices. With this arrangement it will be observed that as the brush 19 rotates the magnet 4 will be connected with the various contacts 15 successively and as these various contacts 15 are connected to the various make-and-break devices $7^a$, $7^b$, $7^c$, $7^d$, etc., the magnet 4 is thereby connected to the make-and-break devices of the group 7 successively and with each make-and-break device periodically.

The shaft 18 may be rotated by any suitable means and I have herein illustrated a time-controlled means therefor which steps the shaft forward at the proper speed relative to that at which the rotary elements 10 are operating as will be presently described.

While, of course, any desirable mechanism for operating the shaft 18 may be employed I have herein shown merely for illustrative purposes, a ratchet wheel 25 fast on the shaft and having six ratchet teeth. This ratchet is actuated by a pawl 26 carried by the armature 27 of an actuating magnet 28. This magnet is arranged to be energized intermittently at predetermined time intervals, the construction being such as will be observed that each time the magnet is energized and the armature thereof attracted the ratchet wheel 25 will be moved forward one step. 29 indicates a stop pawl to prevent retrograde movement of the shaft 18. The magnet 28 is herein shown as taking its current from the battery 20 through the circuit connection 30 and the magnet circuit has therein a clock mechanism illustrated generally at 31 by which the magnet circuit may be closed and opened at regular time intervals.

With the construction thus far described it will be understood that the shaft 18 will be rotated intermittently and that at each step forward the brush 19 will be carried from one contact 15 to the next contact thereby connecting the magnet 4 with the make-and-break devices $7^a$, $7^b$, $7^c$, etc. successively and also connecting said magnet 4 with each make-and-break device periodically, that is, once for each rotation of the shaft 18. It will also be observed that in passing from one contact 15 to the next contact the brush 19 wipes over an insulated section 16 and thereby opens or breaks the circuit of the magnet 4. The circuit of the magnet 4 is thus alternately closed and open and is also connected to the various make-and-break devices successively.

The speed of rotation of the shaft 18 must be such relative to that of the rotation of the members 10 of the make-and-break devices that the brush 19 will dwell on each contact 15 a sufficiently long time to enable the corresponding make-and-break device 10 to perform its function in actuating the magnet 4, provided, of course, that the corresponding machine is running.

In the present embodiment of my invention I have provided a construction for actuating the counter or indicator that requires two impulses of the magnet 4 to step the counter forward and where this construction is employed it is necessary to have the brush 19 dwell on any contact 15 a sufficient length of time to allow the member 10 to make at least a complete rotation because with the arrangement of make-and-break device as shown the magnet circuit will be closed twice during each rotation thereof.

Such a mechanism is illustrated in detail in Figs. 2 and 3. In said Figs. the counter casing is shown at 1 and the counter is actuated from a gear wheel 32 fast on the shaft thereof which meshes with another gear wheel 33 that is fast on a shaft 34 which is journalled in a frame 35 associated with the magnet 4. This shaft 34 has fast thereon a ratchet wheel 36 with which co-operate two pawls 37 and 38. The pawl 37 is pivotally mounted on the end of an arm 39 which is loosely mounted on the shaft 34 and the pawl 38 is pivotally mounted on an arm 40 also loosely mounted on said shaft. These two arms are connected by the links 41, 42 which are pivoted to the arms and which are pivotally connected together at 43. The two pawls are connected by a spring 44 which functions both to hold the pawls in engagement with the ratchet wheel and also to give an operative movement thereto. The arrangement of the spring is such that it tends to draw the arms 39 and 40 toward each other or into the position shown in Fig. 4, in doing which the pawl 38 turns the ratchet wheel 36 forward.

The links 41, 42 are pivotally connected to the outer end of a lever 45 which in turn is pivoted to the frame 35 at 46 and the position of which is controlled by the magnet 4 through a suitable escapement mechanism. This escapement mechanism comprises an escapement member 47 formed on the end 48 of the lever 45 and provided with an opening or slot 49 which has two teeth 50, 51 formed on the lower edge thereof and a single tooth 52 formed on the upper edge thereof. These teeth co-operate with a pawl 53 carried on the end of the armature 54 of the magnet 4. The tooth 52 is situated almost opposite but slightly in the rear of the tooth 50. The normal position of the parts is that shown in Fig. 2, in which the escapement member 47 is in a position with the pawl 53 engaging the tooth 50. When in this position the pawl 50 retains the lever 45 and the link construction 41, 42, 39 in the position shown in Fig. 2 against the action of the spring 44 which normally tends to swing the arms 39, 40 toward each other thereby forcing the center 43 outwardly and swinging the escapement end of the lever 45 toward the right.

When the magnet 4 is energized and the armature is lifted the pawl 53 will be released from the tooth 50 and will be brought into engagement with the tooth 52. The position of the tooth 52 relative to the tooth 50 is such, however, that the shift in position of the pawl 53 from the tooth 50 to the tooth 52 does not permit of any appreciable movement of the lever 45. When the magnet is deenergized the pawl will drop by gravity and will engage the tooth 51 thereby allowing a partial movement of the lever 45. When the magnet is energized a second time and the pawl is lifted from the tooth 51 then there is nothing to prevent the complete movement of the lever 45 under the influence of the spring 44 and the result will be that the counter 1 will be given one step forward.

It will thus be seen that in order to actuate the counter 1 it is necessary to have the magnet 4 energized twice. The reason for this is to differentiate between a running machine and one which might be stopped with the make-and-break device in the position shown at 7', Fig. 1, that is, with the contact portion 10 connecting the brushes 13. In such case it will be observed that when the brush 19 comes into engagement with the contact 15 with which the make and break device 7' is connected a circuit will be closed through the magnet 4 and if the device was arranged so that the counter would be actuated by a single impulse of the magnet said counter would be actuated by the stopped machine and would not give the accurate indication desired.

By providing means whereby the counter 1 is advanced only when the magnet 4 is given two successive impulses it is possible to differentiate between a stopped and a running machine because if the machine is running the brush 19 is always in engagement with any contact 15 for a period of time long enough to permit the make and break device to make and break the circuit of the magnet 4 twice.

After each escapement device has been released by two impulses of its magnet it is necessary to restore it again to the position shown in Fig. 2 in order to place the mechanism in condition for the next operation. I have, therefore, provided a restoring device for this purpose and which comprises a rock shaft 55 carrying an arm 56 which is adapted to engage the escapement member 49 and move it from the position shown in Fig. 4 to that shown in Fig. 2. This rock shaft has another arm 57 fast thereon which is connected by a link 58 with the armature 59 of a restoring magnet 60. Whenever the restoring magnet is energized the armature is attracted thereby rocking the rock shaft 55 and causing the restoring arm 56 to engage the escapement 47 and return it to the position shown in Fig. 2.

I have provided herein means for actuating the restoring magnet 60 at each forward step of the shaft 18 so that the escapement will be restored after the device has been connected to each machine for the purpose of making a test as to whether it is running or not.

Associated with the distributor is a ring 61 having an alternate conducting section 62 and an insulating section 63. The conducting sections 62 are arranged in line with the insulating sections 16 and the insulating sections 63 of the ring 61 are in line with the conducting sections 15. The conducting sections 62 are connected by circuit connections 64 to the restoring magnet 60 and the latter is connected to the battery 20 through a circuit connection 65. The brush 19 is of sufficient length so that it will engage the ring 61 and, therefore, whenever the brush is passing from one contact 16 to the next adjacent one it will pass over the conducting section 62 of the ring 61 thereby closing the circuit through the restoring magnet 60 and causing the latter to to be actuated.

From the above it will be evident that whenever the magnet 4 is connected in the machine it will be operative to actuate the counter 1 only if said machine is running and as the distributor connects the magnet with the make-and-break devices successively and repeatedly it will follow that at the end of any time period, such, for instance, as a day or a week, the counter will indicate the total of the machine-running hours of the group of machines during such time interval. This counter may be graduated so as to indicate machine-running hours or so as to indicate output, or if the wages of the operator are paid in accordance with the output of the machine the counter might even be graduated to indicate the wages due the operator. The various make-and-break devices may be considered as machine-running-time-signaling-stations and these stations modify and transmit electrical impulses to the meter register through the electromechanical connections comprising the magnet and the distributor.

The above description has been confined mostly to the operation of the magnet 4 and its counter 1 as providing an indication of the machine-running hours of the group of machines corresponding to the make-and-break devices 7. To enlarge the capacity of the device so that it will give indications as to the machine-running hours of other groups of machines such as would correspond to the groups of make-and-break devices 8 and 9 it is only necessary to provide additional counters 2 and 3 with their additional magnets 5 and 6 and to provide additional rings 14ª and 14ᵇ similar to the ring 14 but insulated therefrom and having the conducting sections thereof connected to the make-and-break devices. It will also be necessary to either have the brush 19 of a size to engage all of the rings 14 or to have individual brushes on the shaft 18 for the various rings.

I claim:

1. In a device for indicating the machine-running time of a group of machines, the combination with a counter, of electro-mechanical means to actuate the same, and timing mechanism to limit the frequency of actuation of the counter so that an indeterminate number of impulses received from any machine within a predetermined time interval will cause one advancement of the counter for each said time interval if the machine is running and no advancement if the machine is idle.

2. In a device for indicating the machine-running time of a group of machines, the combination with a counter, of electro-mechanical means to actuate the same, a circuit interrupter associated with each machine, a non-interfering control mechanism to limit the current supply to one such interrupter at any one time, and a timing mechanism adapted to limit the frequency and extent of actuation of the counter irrespective of the number of impulses more than one transmitted by each circuit interrupter.

3. In a device for determining the machine-running time of a group of machines, the combination with a counter, of means, including a magnet, for actuating the same, a make-and-break device for each machine arranged, if the machine is running, to transmit to the magnet an indeterminate number of impulses within a fixed time interval the duration of which is registered on the counter when the magnet is energized by more than one of said impulses within said time interval.

4. In a device for indicating the machine-running time of a group of machines, the combination with a counter of means, including a magnet, for actuating the same, a make and break device operatively connected to each machine, means for electrically connecting the magnet successively with the make-and-break devices and for maintaining said connection with each make and break device for a predetermined time interval, said counter-actuating means being responsive to the operation of any make-and-break device to which it is connected when the corresponding machine is running but irresponsive when said machine is idle.

5. In a device for determining the machine-running hours of a group of machines, the combination with a counter, of means, including a magnet, for actuating the same, a make-and-break device operatively connected to each machine, a distributor for electrically connecting the magnet successively with each of the make-and-break devices for a certain time interval, said counter-actuating means being operative to advance the counter one step for each time interval within which the circuit of the magnet is repeatedly interrupted by one said make-and-break device.

6. In an elapsed-running-time counter, the combination with a make-and-break device mechanically operated, of a magnetically actuated differentiating mechanism, an electric circuit connecting the make-and-break device with the differentiating mechanism, an operating device for said counter normally adapted to advance the same periodically, and means for preventing the advancement of the counter if less than a plurality of impulses is transmitted by the make-and-break device to the differentiating mechanism within one cycle of the counter operating device.

7. The invention set forth in claim 6 in which the differentiating mechanism comprises a ratchet and pawl movement, a magnet and an escapement connected with the armature of said magnet.

8. An electro-mechanically actuated counter including a step-by-step escapement, means for progressively advancing the escapement by one or more steps and for periodically retracting the same to its initial position whereby the successive advancements of the counter are limited to the number of completed excursions and retractions of the escapement, thus rendering the partially completed excursions ineffective to advance the counter.

9. In a running-machine-time meter, a counter adapted to be periodically set for actuation, a counter-actuating magnet, an impulse transmitter associated with a machine the running time of which is to be metered, an electric circuit connecting between the transmitter and the magnet, and means nonresponsive to the first of an indeterminate number of impulses transmitted through said circuit and magnet after each setting of the counter but responsive to said first together with a subsequent impulse to further advance the latter.

In testimony whereof, I have signed my name to this specification.

RALPH W. BUMSTEAD.